US012110863B2

United States Patent
Arraztoa Magaña et al.

(10) Patent No.: US 12,110,863 B2
(45) Date of Patent: Oct. 8, 2024

(54) WIND TURBINE ROTOR BLADE SPACER, TRANSPORTATION AND STORAGE SYSTEM FOR WIND TURBINE ROTOR BLADES AND RELATED METHOD

(71) Applicant: NORDEX ENERGY SPAIN, S.A.U., Barasoain (ES)

(72) Inventors: Unai Arraztoa Magaña, Barasoain (ES); Ander Gastón Lujambio, Barasoain (ES); Miguel Núñez Polo, Barasoain (ES); Enrique Domínguez Domínguez, Vigo (ES); David Martínez Rodríguez, Vigo (ES)

(73) Assignee: NORDEX ENERGY SPAIN, S.A.U., Navarra (ES)

( * ) Notice: Subject to any disclaimer, the term of this patent is extended or adjusted under 35 U.S.C. 154(b) by 0 days.

(21) Appl. No.: 17/551,856

(22) Filed: Dec. 15, 2021

(65) Prior Publication Data
US 2022/0195990 A1 Jun. 23, 2022

(30) Foreign Application Priority Data
Dec. 17, 2020 (EP) .................... 20383108

(51) Int. Cl.
F03D 13/40 (2016.01)
(52) U.S. Cl.
CPC .......... *F03D 13/40* (2016.05); *F05B 2260/02* (2013.01)

(58) Field of Classification Search
CPC .... B60P 7/12; B60P 3/40; F03D 13/40; F05B 2260/02; F05B 2260/30
USPC ...... 410/32–36, 42, 44, 45, 53, 82, 120, 155
See application file for complete search history.

(56) References Cited

U.S. PATENT DOCUMENTS

| | | | | |
|---|---|---|---|---|
| 2006/0285937 | A1* | 12/2006 | Wobben | B60P 3/40 410/45 |
| 2007/0248431 | A1* | 10/2007 | Jensen | B60P 3/40 410/45 |
| 2014/0314576 | A1* | 10/2014 | Lieberknecht | B60P 3/40 29/889.7 |
| 2019/0301430 | A1 | 10/2019 | Uyunuk et al. | |
| 2021/0025370 | A1* | 1/2021 | Kofman | B60P 7/13 |
| 2023/0258159 | A1* | 8/2023 | Poisler | F03D 13/40 410/44 |

FOREIGN PATENT DOCUMENTS

| | | |
|---|---|---|
| EP | 1387802 A1 | 2/2004 |
| EP | 3101271 A1 | 12/2016 |

\* cited by examiner

*Primary Examiner* — Stephen T Gordon
(74) *Attorney, Agent, or Firm* — Hayes Soloway PC

(57) ABSTRACT

The present invention relates to a wind turbine rotor blade spacer, a transportation and storage system for wind turbine rotor blades and a related method that prevent the vertical flexion of each one of the blades assemblies, minimizing the stresses and avoiding the contact between vertically and/or horizontally adjacent blades, and in consequence, blade damage. Also, the overall occupied surface by the system once assembled is minimised.

18 Claims, 16 Drawing Sheets

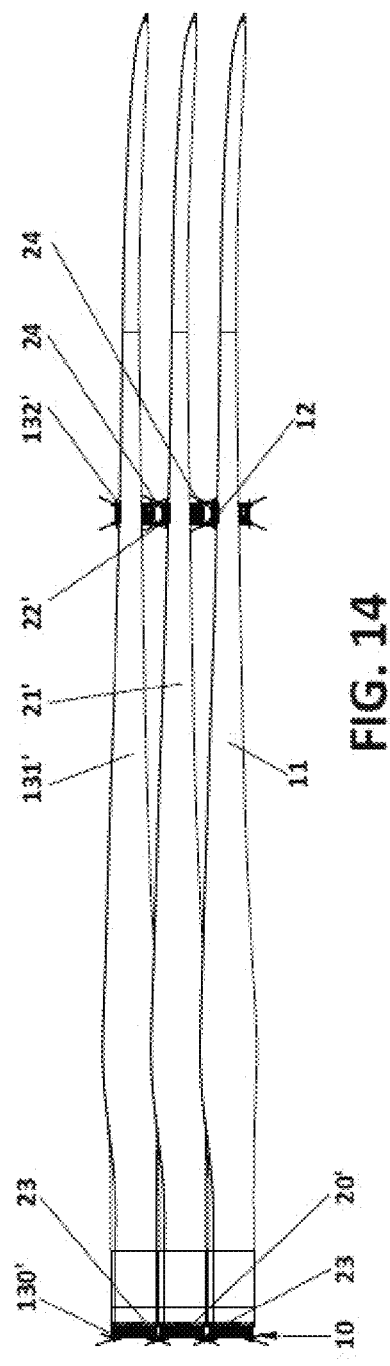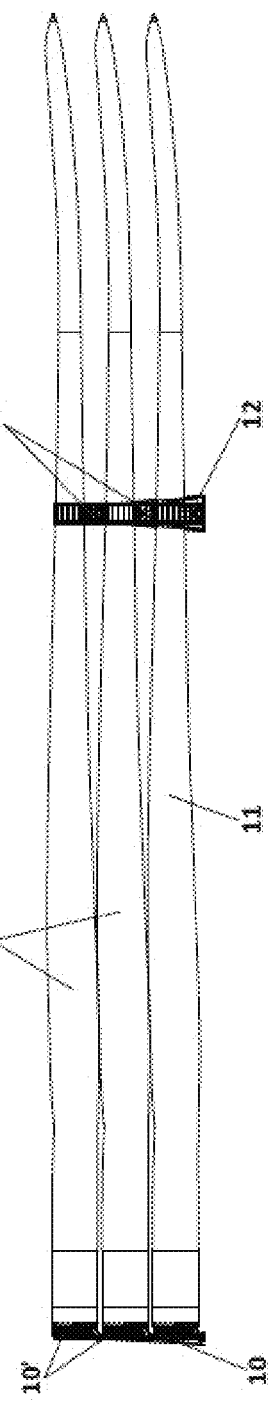
FIG. 14
FIG. 15

WIND TURBINE ROTOR BLADE SPACER, TRANSPORTATION AND STORAGE SYSTEM FOR WIND TURBINE ROTOR BLADES AND RELATED METHOD

CROSS-REFERENCE TO RELATED APPLICATIONS AND PRIORITY

This patent application claims priority from European Patent Application No. 20383108.96 filed Dec. 17, 2020. This patent application is herein incorporated by reference in its entirety.

Object of the Invention

The present invention relates to a wind turbine rotor blade spacer configured to guide a second blade assembly comprising a second blade with respect to a first blade assembly comprising a first blade, a transportation and storage system for wind turbine rotor blades and a related method that prevent the vertical flexion of each one of the blades assemblies, minimizing the stresses and avoiding the contact between vertically and/or horizontally adjacent blades, and in consequence, blade damage. Also, the overall occupied surface by the system once assembled is minimised.

BACKGROUND OF THE INVENTION

Wind turbines are supported by a tower and driven by multiple wind turbine blades, each of one is typically tens of meters in length. As efforts are made to increase the amount of electrical power generated per wind turbine, the length of the wind turbine blades has also correspondingly increased.

The significant length of currently available wind turbine blades, as well as the continuing efforts to design and manufacture even longer wind turbine blades, involves a challenge for their transportation (especially by ship) from the manu-facturing site to the wind turbine farms.

Currently, the blade manufacturer typically bolts fixtures to the blade root and tip sections, which provide points for the blades to be lifted and moved without damage, as well as for securing the blades to ship decks and other transportation vehicles.

The lifting of wind turbine blades as well the process of securing them to the ship decks present a number of other problems related to efficiently and ef-fectively securing the blades to the ship decks for safe transit overseas.

Another important factor is maximizing the number of wind turbine blades that can be carried per shipload. For example, in some circumstances, the blades are stacked in an edge-horizontal orientation to increase packing density; how-ever, depending on the size of the ship, the loading applied during transport at sea can cause the horizontally-oriented bodies of the stacked blades to flex vertically, which can result in undue stress, contact between vertically adjacent blades, and blade damage.

Although these fixtures are usually designed and fabricated for being re-used, in actual practice, said components are often lost or discarded at the wind turbine farms, which can result in a significant monetary loss to the wind turbine blade manufacturer.

The wind turbine rotor blade spacer, the transportation and storage system for wind turbine rotor blades and the related method of the present invention aims to solve most of the aforementioned problems.

DESCRIPTION OF THE INVENTION

The present invention relates to a wind turbine rotor blade spacer for the transportation and storage of wind turbine rotor blades having a longitudinal axis and comprising a root end and a tip, and two halves bonded together forming an outer shell, wherein the wind turbine rotor blade spacer comprises guiding means being adapted to guide, in use, a second blade assembly comprising a second blade with respect to a first blade assembly comprising a first blade. Preferably, the guiding means of the wind turbine rotor blade spacer are configured to guide, in use, the second blade assembly with respect to a first root frame or a first tip frame of the first blade assembly. Preferably, the guiding means of the wind turbine rotor blade spacer are configured to guide, in use, the second blade assembly with respect to the first root frame or the first tip frame of the first blade assembly, in a direction having a vertical and/or horizontal component. Preferably, the guiding means of the wind turbine rotor blade spacer comprises an open trapezoidal end, thus facilitating the guidance.

The wind turbine rotor blade spacer so configured avoids the contact between vertically and/or horizontally adjacent blades, and in consequence, blade damage. Also, in use, the overall occupied surface by the wind turbine rotor blade spacer, the first blade assembly and the second blade assembly is minimised. The wind turbine rotor blade spacer also prevents the vertical flexion of each one of the blades assemblies, minimizing the stresses.

Preferably, the guiding means of the at least one rotor blade spacer are also configured to avoid, in use, the displacement of the second blade assembly with respect to the first blade assembly in a direction essentially parallel to the longitudinal axis of the wind turbine rotor blades.

Optionally, the wind turbine rotor blade spacer comprises a height which is less than 25% of a height of the first root frame or of a height of the first tip frame. Preferably, the height of the wind turbine rotor blade spacer is less than 10% of the height of the first root frame or of the height of the first tip frame. Optionally, the wind turbine rotor blade spacer comprises a depth which is greater than a depth of the first root frame or than a depth of the first tip frame, the depth being measured in a longitudinal direction defined by the longitudinal axis of the first blade of the first blade assembly. So configured, the overall occupied surface by the spacer together with the first blade assembly and the second blade assembly, in use, i.e. once guided, is minimised, since a root end of the first blade and a root end of the second blade, or a tip of the first blade and a tip of the second blade, can be arranged as close as possible since the height of the spacer does not interfere with the root ends or the tips of the first and second blades, allowing the root ends or the tips of the first and second blades to be at least partially arranged above or below the spacer, depending on which end, and upper end or a lower end, of a second root frame or a second tip frame of the second blade assembly, the spacer is intended to guide the second blade assembly.

Optionally, the wind turbine rotor blade spacer comprises holes being adapted to join the second blade assembly to the first blade assembly.

Optionally, the wind turbine rotor blade spacer comprises at least a recess which facilitates the access to the holes for joining the second blade assembly to the first blade assembly by means of joining means.

Preferably, the wind turbine rotor blade spacer is a root spacer configured, in use, to be arranged between the first root frame and a second root frame of the second blade assembly).

Also preferably, the wind turbine rotor blade spacer is a tip spacer configured, in use, to be arranged between the first tip frame and a second tip frame of the second blade assembly.

The invention also relates to a transportation and storage system for a wind turbine rotor blade being compact and rigid by joining together a first blade assembly and a second blade assembly by means of at least one wind turbine rotor blade spacer as described above. Moreover, due to the way that the first blade assembly and the second blade assembly are joined together by means of at least one rotor blade spacer, the angle used for the stowage of the blades with respect to the transport or storage surface is reduced and hence the overall occupied surface, thus allowing to use smaller floors, preferably vessel floors, truck floors, factory floors or similar.

The transportation and storage system for wind turbine rotor blades having a longitudinal axis and comprising a root end and a tip, and two halves bonded together forming an outer shell, comprises:
- at least two root frames, a first root frame and a second root frame, each one of the first root frame and the second root frame configured to support the root end of a first wind turbine blade and the root end of a second wind turbine blade respectively;
- at least two tip frames, a first tip frame and a second tip frame, each one of the first tip frame and the second tip frame configured to support the tip of the first wind turbine blade and the tip of the second wind turbine blade respectively;
- at least one rotor blade spacer as described above, wherein the at least one rotor blade spacer is configured to guide the second blade assembly with respect to the first blade assembly;
    - wherein the at least one rotor blade spacer is configured to be joined to the first root frame and to the second root frame or to be joined to the first tip frame and to the second tip frame such that the first blade assembly comprising at least the first root frame, the first tip frame and the first wind turbine blade is joined to the second blade assembly comprising at least the second root frame, the second tip frame and the second wind turbine blade.

The transportation and storage system for wind turbine rotor blades thus established prevents the vertical flexion of each one of the blades assemblies, minimizing the stresses and avoiding the contact between vertically and/or horizontally adjacent blades, and in consequence, blade damage. Also, the overall occupied surface by the system once assembled is minimised.

The presence of the at least one rotor blade spacer allows that the second blade assembly can be joined to the first blade assembly at the same time that a marker of separation is established between the first blade assembly and the second blade assembly. Optionally, the first root frame and the second root frame comprise a first width, the width being measured in a horizontal direction being perpendicular to the longitudinal axis of the first blade of the first blade assembly, and the root end of the first blade and the second blade comprises a first diameter, wherein the first width is smaller than the first diameter. So configured, the overall occupied surface by the system once assembled is minimised, since the root end of the first blade and the root end of the second blade are at least partially arranged above or below the at least one rotor blade spacer, depending on which end, an upper end or a lower end, of the root frame or the tip frame of the second blade assembly, the spacer is intended to guide the second blade assembly.

The system further comprises joining means configured to join the second blade assembly to the first blade assembly, preferably through the holes of the wind turbine rotor blade spacer. Preferably, the joining means are bolts and nuts.

Optionally, the wind turbine rotor blade spacer comprises holes being adapted to join the second blade assembly to the first blade assembly.

Optionally, the wind turbine rotor blade spacer comprises at least a recess which facilitates the access to the holes to tight, in use, joining means, preferably bolts and nuts, for joining the second blade assembly to the first blade assembly.

The first root frame is mounted at a defined distance from the first tip frame, which it depends of the blade model.

Additionally, due to the size of the first root frame and the second root frame, they can be put inside a standard closed container for return, with associated lower costs. Moreover, the sizes of root and tip frames and spacers have been designed to be able to transport everything in standard containers, saving costs.

Optionally, the system further comprises securing means for fixing the first blade assembly and the second blade assembly to a transport or storage surface being a floor, preferably a vessel floor, a truck floor, a factory floor or similar. Preferably, the securing means are lashing chains configured to lash the assemblies to the transport or storage surface. In this respect, the at least one rotor blade spacer provides more stability to the system, in turn reducing the lateral forces, thus allowing to reduce an angle formed by the lashing chains with the transport or storage surface. Since the lashing chains are disposed almost vertical, the blades can be brought closer together and the space occupied can be reduced, also reducing the number of lashing chains.

Preferably, the at least one rotor blade spacer as described above comprises:
- at least one root spacer configured to be arranged between the at least two root frames; and
- at least one tip spacer configured to be arranged between the at least two tip frames;
- wherein the at least one root spacer and/or the at least one tip spacer are/is configured to guide the second blade assembly with respect to the first blade assembly; and
- wherein the at least one root spacer is configured to be joined to the first root frame and to the second root frame, and the at least one tip spacer is configured to be joined to the first tip frame and to the second tip frame.

Optionally, the at least one rotor blade spacer is joined to the first root frame and to the second root frame or to the first tip frame and to the second tip frame at a lower end of the first root frame and the second root frame or at a lower end of the first tip frame and the second tip frame.

Optionally, the at least one rotor blade spacer is joined to the first root frame and to the second root frame or to the first tip frame and to the second tip frame at an upper end of the first root frame and the second root frame or at an upper end of the first tip frame and the second tip frame.

Optionally, the second blade assembly is displaceable with respect to the first blade assembly. Optionally, the second blade assembly is displaceable with respect to first blade assembly in a direction having a vertical and/or horizontal component. In this manner, it is possible to carry out the stowage of the second blade assembly with respect to the first blade assembly in a more flexible way. Optionally, the second blade assembly is displaceable with respect to the first blade assembly in a horizontal direction essentially perpendicular to the longitudinal axis of the wind turbine rotor blades. It is preferably that the first root frame and the second root frame are contained in a first plane parallel to the horizontal direction, and the first tip frame and the second root frame are contained in a second plane parallel to the horizontal direction.

Preferably, the at least two tip frames comprises an upwardly open cradle-receiving space configured to receive a cradle, wherein the cradle is adapted to support the blade in a position in which a line joining the two halves of the outer shell of the blade forms an angle of 20-50° with horizontal, much preferably an angle of 25-45° with the horizontal, and much preferably an angle of 37.5° with the horizontal. This configuration allows to minimize the width of the at least one rotor blade spacer, and in consequence the overall width of the system, thus reducing the occupied surface. This configuration also makes possible to carry out the stowage of the second blade assembly with respect to the first blade assembly in a direction having a vertical and/or horizontal component since the presence of the at least one rotor blade spacer ensures that there is no interference of the first wind turbine blade with the second wind turbine blade, independently of each component of the stowage direction and assuming that during the stowage operation, the first root frame and the second root frame are contained in a first plane, and the first tip frame and a second root frame are contained in a second plane.

Optionally, since the at least two tip frames comprises an upwardly open cradle-receiving space configured to receive a cradle, the at least two tip frames further comprise protector of the trailing edge of the blade.

Optionally, the system further comprises at least one third blade assembly configured to be joined to the second blade assembly in the same way as those described above for the second blade assembly and the first blade assembly by means of an additional rotor blade spacer, thus configuring a transportation and storage one-row system for wind turbine rotor blades.

Optionally, the system further comprises at least one additional first blade assembly configured to be joined on top of the first blade assembly, preferably at least one additional second blade assembly configured to be joined to the additional first blade assembly in the same way as those described above for the second blade assembly and the first blade assembly, by means of an additional rotor blade spacer, and additionally configured to be joined on top of the second blade assembly, and preferably at least one additional third blade assembly configured to be joined to the additional second blade assembly in the same way as those described above for the third blade assembly and the second blade assembly, by means of an additional rotor blade spacer, and additionally configured to be joined on top of the third blade assembly, thus configuring a transportation and storage stacked array system for wind turbine rotor blades.

Optionally, the rotor blade spacers are disposed joining not all the blade assemblies.

Also optionally, the system comprises a pair of rotor blade spacers configured to be joined to the first root frame and the second root frame, or a pair of rotor blade spacers configured to be joined to the first tip frame and the second tip frame or a pair of rotor blade spacers configured to be joined to the first root frame and the second root frame and a pair of rotor blade spacers configured to be joined to the first tip frame and the second tip frame.

Optionally, the system further comprises twist-locks configured to place the additional blade assemblies on top of the blade assemblies, preferably four twist-locks disposed on the root frames and four twist-locks disposed on the tip frames.

Optionally, the at least one rotor blade spacer is only disposed between the first blade assembly and the second blade assembly, wherein the first blade assembly and the second blade assembly are disposed on the bottom, on the top or in an intermediate zone between the bottom and the top of an stacked array of blade assemblies.

Optionally, the second blade assembly further comprises the at least one rotor blade spacer, wherein the second blade assembly is configured to be joined to the first blade assembly.

The invention also relates to a method for the transportation and storage of wind turbine rotor blades carried out with the transportation and storage system described above, wherein the method comprises the following steps:
 a step of guiding the second blade assembly with respect to the first blade assembly by means of the at least one rotor blade spacer;
 a step of joining the at least one rotor blade spacer to the first root frame and to the second root frame, or to the first tip frame and to the second tip frame,
 such that the first blade assembly comprising at least the first root frame, the first tip frame and the first wind turbine blade is joined to the second blade assembly comprising at least the second root frame, the second tip frame and the second wind turbine blade.

Optionally, the step of joining the at least one rotor blade spacer to the first root frame and to the second root frame, or to the first tip frame and to the second tip frame is carried out at a lower end and/or an upper end of the first root frame and the second root frame or at a lower end and/or an upper end of the first tip frame and the second tip frame.

Optionally, the method further comprises a step of displacement of the second blade assembly with respect to the first blade assembly. Optionally, the step of displacement is carried out in a direction having a vertical and/or horizontal component. Optionally, the step of displacement is carried out in a horizontal direction essentially perpendicular to the longitudinal axis of the wind turbine rotor blades. For these three options of the step of displacement of the second blade assembly with respect to the first blade assembly, it is preferably that the first root frame and the second root frame are contained in a first plane, and the first tip frame and a second tip frame are contained in a second plane.

Preferably, the method further comprises a step of supporting the blade in a position in which a line joining the two halves of the outer shell of the blade forms an angle of 20-50° with horizontal, much preferably an angle of 25-45° with the horizontal, and much preferably an angle of 37.5° with the horizontal.

Preferably, the step of guiding the second blade assembly with respect to the first blade assembly by means of the at least one rotor blade spacer is carried out guiding the second blade assembly with respect to the first root frame and/or the first tip frame of the first blade assembly, respectively. Preferably, the step of guiding the second blade assembly with respect to the first blade assembly by means of the at least one rotor blade spacer is carried out guiding the second blade assembly with respect to the first root frame and/or the first tip frame of the first blade assembly, respectively, in a direction having a vertical and/or horizontal component.

Preferably, the step of guiding further comprises a step of blocking the displacement of the second blade assembly with respect to the first blade assembly in a direction essentially parallel to the longitudinal axis of the wind turbine rotor blades.

Optionally, the method further comprises at least one step of joining the at least one third blade assembly to the second blade assembly in the same way as those described above for the step of joining the second blade assembly to the first blade assembly, by means of an additional rotor blade spacer, thus configuring a transportation and storage one-row system for wind turbine rotor blades.

Optionally, the method further comprises at least one step of joining the at least one additional first blade assembly on top of the first blade assembly, preferably at least one step of joining the at least one additional second blade assembly to the additional first blade assembly in the same way as those steps described above for the second blade assembly and the first blade assembly, by means of an additional rotor blade spacer, and additionally at least one step of joining the at least one additional second blade assembly on top of the second blade assembly, and preferably at least one step of joining at least one additional third blade assembly to the additional second blade assembly in the same way as that described above for the step of joining the at least one third blade assembly to the second blade assembly, by means of an additional rotor blade spacer, and additionally at least one step of joining the at least one additional third blade assembly on top of the third blade assembly, thus configuring a transportation and storage stacked array system for wind turbine rotor blades.

Preferably, the at least one rotor blade spacer as described above comprises:
- at least one root spacer configured to be arranged between the at least two root frames; and
- at least one tip spacer configured to be arranged between the at least two tip frames;

and the step of guiding the second blade assembly with respect to the first blade assembly by means of the at least one rotor blade spacer comprises:
- a step of a guiding the second blade assembly with respect to the first blade assembly by means of the at least one root spacer and/or the at least one tip spacer; and the step of joining the at least one rotor blade spacer to the first root frame and to the second root frame, or to the first tip frame and to the second tip frame comprises:
- a step of joining the at least one root spacer to the first root frame and to the second root frame, and
- a step of joining the at least one tip spacer to the first tip frame and to the second tip frame.

BRIEF DESCRIPTION OF THE DRAWINGS

FIG. 14 shows a plan view according to an embodiment of the invention wherein the system comprises a stacked array of 3 row×3 columns blade assemblies.

FIG. 15 shows a frontal view of FIG. 14.

PREFERRED EMBODIMENT OF THE INVENTION

Figure 1:
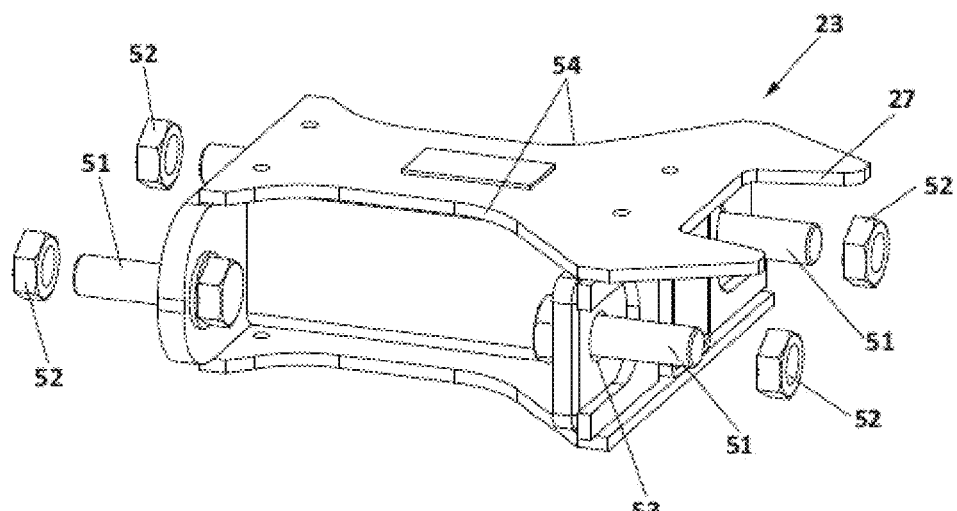
FIG. 1 shows a perspective view of the wind turbine rotor blade spacer of the present invention according to a first preferred embodiment, wherein the wind turbine rotor blade spacer is a root spacer configured to be arranged between at least two root frames.

A detailed description of the wind turbine rotor blade spacer configured to guide a second blade assembly comprising a second blade with respect to a first blade assembly comprising a first blade, the transportation and storage system for wind turbine rotor blades and the related method of the present invention is now described, according to FIGS. 1 to 19 referred above.

The wind turbine rotor blade spacer (23, 24) for the transportation and storage of wind turbine rotor blades having a longitudinal axis (1) and comprising a root end (2) and a tip (5), and two halves (7, 8) bonded together forming an outer shell, comprises guiding means (27, 56) being adapted to guide a second blade assembly (20, 21, 22) comprising a second blade (21) with respect to a first blade assembly (10, 11, 12) comprising a first blade (11).

In a first preferred embodiment of the invention shown in FIG. 1, the wind turbine rotor blade spacer is a root spacer (23) configured to be arranged between at least two root frames (10, 20). In this case, the guiding means (27) of the root spacer (23) are configured to guide, in use, the second blade assembly (20, 21, 22) with respect to a first root frame (10) of the first blade assembly (10, 11, 12). Preferably, the guiding means (27) of the root spacer (23) are configured to guide, in use, the second blade assembly (20, 21, 22) with respect to the first root frame (10) of the first blade assembly (10, 11, 12), in a direction having a vertical and/or horizontal component. Preferably, the guiding means (27) of the root spacer (23) comprises an open trapezoidal end, thus facilitating the guidance.

Also, the guiding means (27) of the root spacer (23) are also configured to avoid the displacement of the second blade assembly (20, 21, 22,) with respect to the first blade assembly (10, 11, 12) in a direction essentially parallel to the longitudinal axis (1) of the wind turbine rotor blades (11, 21).

Preferably, the root spacer (23) comprises a height which is less than 10% of a height of the first root frame (10).

Preferably, the root spacer (23) comprises a depth which is greater than a depth of the first root frame (10), the depth being measured in a longitudinal direction defined by the longitudinal axis (1) of the first blade (11) of the first blade assembly (10, 11, 12).

Preferably, the root spacer (23) comprises holes (53) being adapted to join the second blade assembly (20, 21, 22) to the first blade assembly (10, 11, 12).

Preferably, the root spacer (23) comprises at least a recess (54) which facilitates the access to the holes (53) for joining the second blade assembly (20, 21, 22) to the first blade assembly (10, 11, 12) by means of joining means. Preferably, the joining means are bolts (51) and nuts (52).

Figure 2:
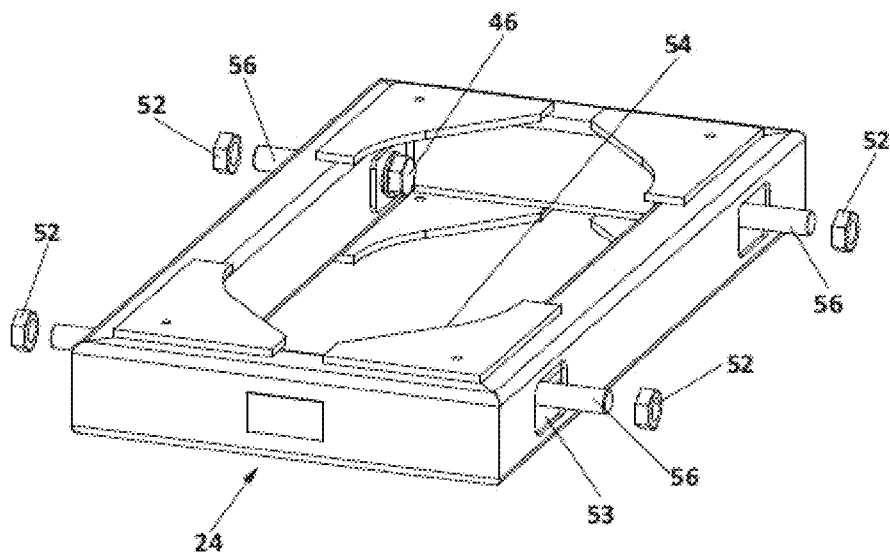
FIG. 2 shows a perspective view of the wind turbine rotor blade spacer of the present invention according to a second preferred embodiment, wherein the wind turbine rotor blade spacer is a tip spacer configured to be arranged between at least two tip frames.
Figure 3:
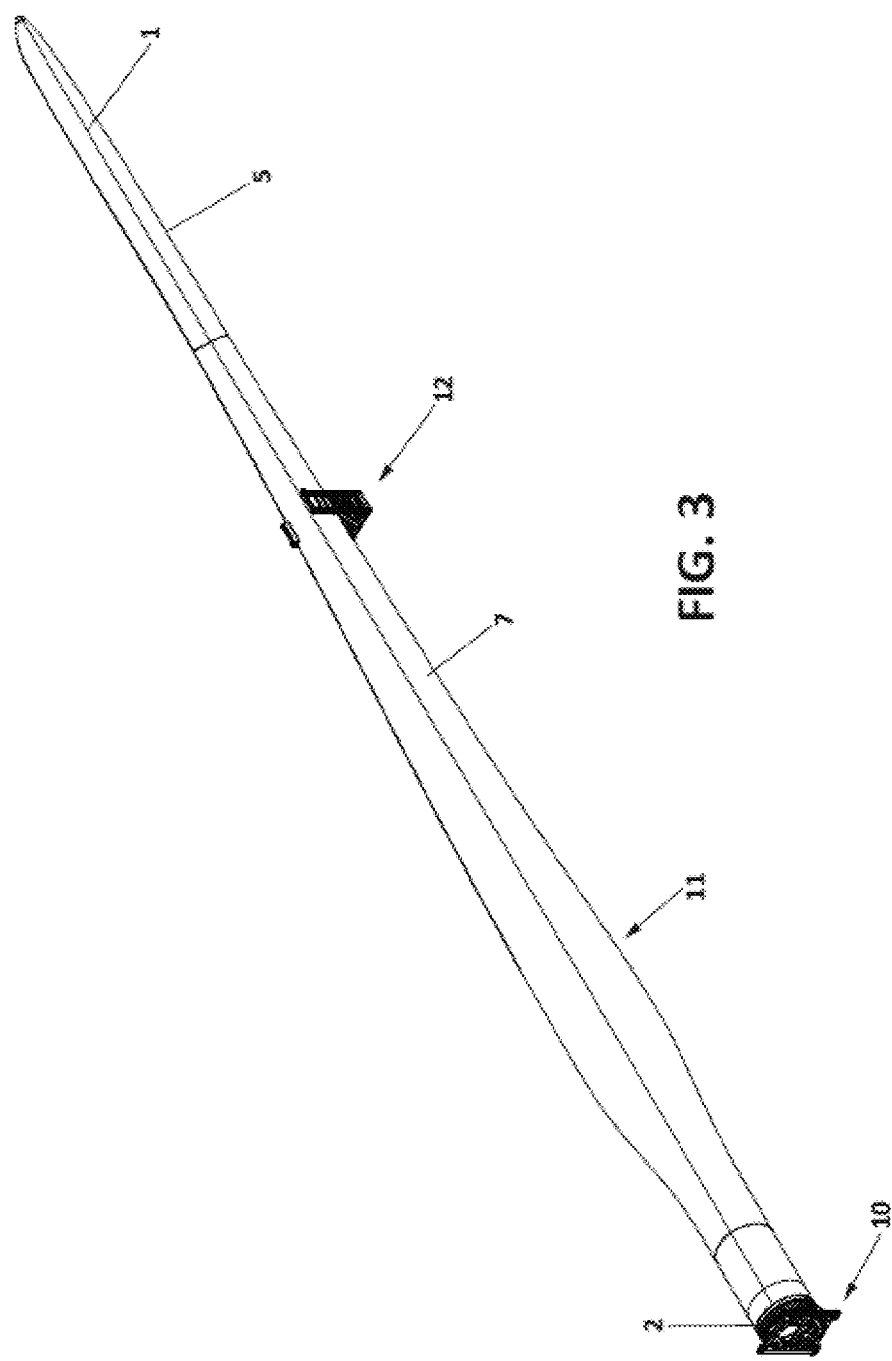
FIG. 3 shows a perspective view of a first blade assembly according to the transportation and storage system for wind turbine rotor blades of the present invention.
Figure 4:
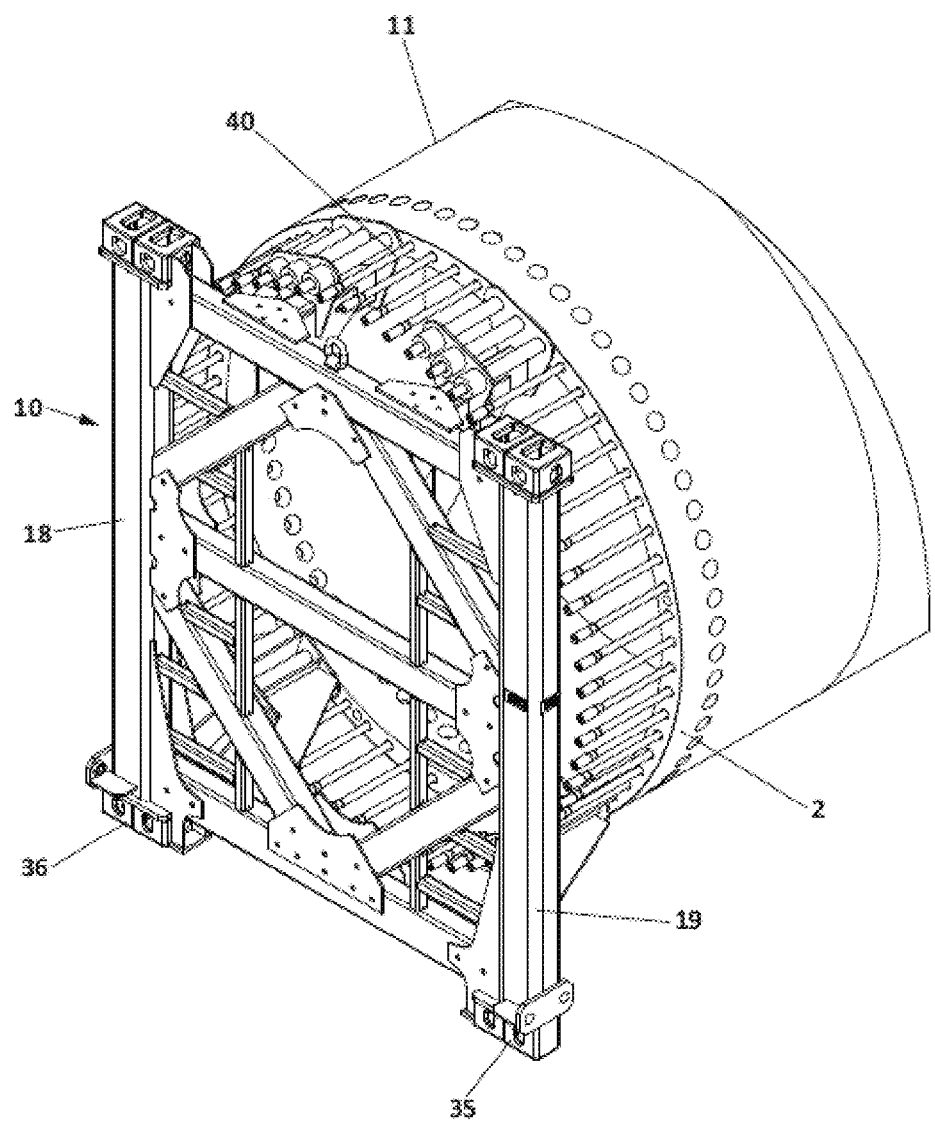
FIG. 4 shows a detail of the first root frame of the first blade assembly of FIG. 3.

In a second preferred embodiment of the invention shown in FIG. 2, the wind turbine rotor blade spacer is a tip spacer (24) configured to be arranged between at least two tip frames (12, 22). In this case, the guiding means (56) of the tip spacer (24) are configured to guide, in use, the second blade assembly (20, 21, 22) with respect to a first tip frame (12) of the first blade assembly (10, 11, 12). Preferably, the guiding means (56) of the tip spacer (24) are configured to guide, in use, the second blade assembly (20, 21, 22) with respect to the first tip frame (12) of the first blade assembly (10, 11, 12), in a direction having a vertical and/or horizontal component. Preferably, the guiding means (56) of the tip spacer (24) comprises bolts.

Preferably, the tip spacer (24) comprises a height which is less than 10% of a height of the first tip frame (12).

Preferably, the tip spacer (24) comprises a depth which is greater than a depth of the first tip frame (12), the depth being measured in a longitudinal direction defined by the longitudinal axis (1) of the first blade (11) of the first blade assembly (10, 11, 12). Also preferably, the tip spacer (24) comprises a depth which is the same than a depth of the first tip frame (12).

Preferably, the tip spacer (24) comprises holes (53) being adapted to join the second blade assembly (20, 21, 22) to the first blade assembly (10, 11, 12). Also preferably, the holes (53) are slotted holes configured to correct he differences that may exist between the positions of the tip frames (12, 22) of the first blade assembly (10, 11, 12) and the second blade assembly (20, 21, 22).

Preferably, the tip spacer (24) comprises at least a recess (54) which facilitates the access to the holes (53) for joining the second blade assembly (20, 21, 22) to the first blade assembly (10, 11, 12) by means of joining means. Preferably, the joining means are bolts (56) and nuts (52).

The transportation and storage system for wind turbine rotor blades having a longitudinal axis (1) and comprising a root end (2) comprising studs (40) and a tip (5) and two halves (7, 8) bonded together forming an outer shell, comprises:

at least two root frames (10, 20), a first root frame (10) and a second root frame (20), each one of the first root frame (10) and the second root frame (20) configured to support the root end (2) of a first wind turbine blade (11) and the root end (2) of a second wind turbine blade (21) respectively;

at least two tip frames (12, 22), a first tip frame (12) and a second tip frame (22), each one of the first tip frame (12) and the second tip frame (22) configured to support the tip (5) of the first wind turbine blade (11) and the tip (5) of the second wind turbine blade (21) respectively;

at least one root spacer (23) configured to be arranged between the at least two root frames (10, 20);

at least one tip spacer (24) configured to be arranged between the at least two tip frames (12, 22);

wherein the at least one root spacer (23) and/or the at least one tip spacer (24) are/is configured to guide the second blade assembly (20, 21, 22) with respect to the first blade assembly (10, 11, 12); and wherein the at least one root spacer (23) is configured to be joined to the first root frame (10) and to the second root frame (20) and the at least one tip spacer (24) is configured to be joined to the first tip frame (12) and to the second tip frame (22) such that the first blade assembly comprising at least the first root frame (10), the first tip frame (12) and the first wind turbine blade (11) is joined to a second blade assembly comprising at least the second root frame (20), the second tip frame (22) and the second wind turbine blade (21).

Preferably, the at least two root frames (10, 20) comprise fixation plates (61) with orifices (62) wherein the studs (40) of the blades (11, 21) are inserted.

Preferably, the at least two tip frames (12, 22) comprise an upwardly open cradle-receiving space (15, 25) configured to receive a cradle (16, 26), wherein the cradle (16, 26) is adapted to support the blade (11, 21) and fixing means, preferably ratchet buckles (37) and slip jackets (38), for fixing the tip (5) of the blades (11, 21) to the first tip frame (12) and the second tip frame (22).

Preferably, the cradle (16, 26) of the at least two tip frames (12, 22) is adapted to support the blade (11, 21) in a position in which a line (6) joining the two halves (7, 8) of the outer shell of the blade (11, 21) forms an angle of 20-50° with horizontal, much preferably an angle of 25-45° with the horizontal, and much preferably an angle of 37.5° with the horizontal.

Figure 5:
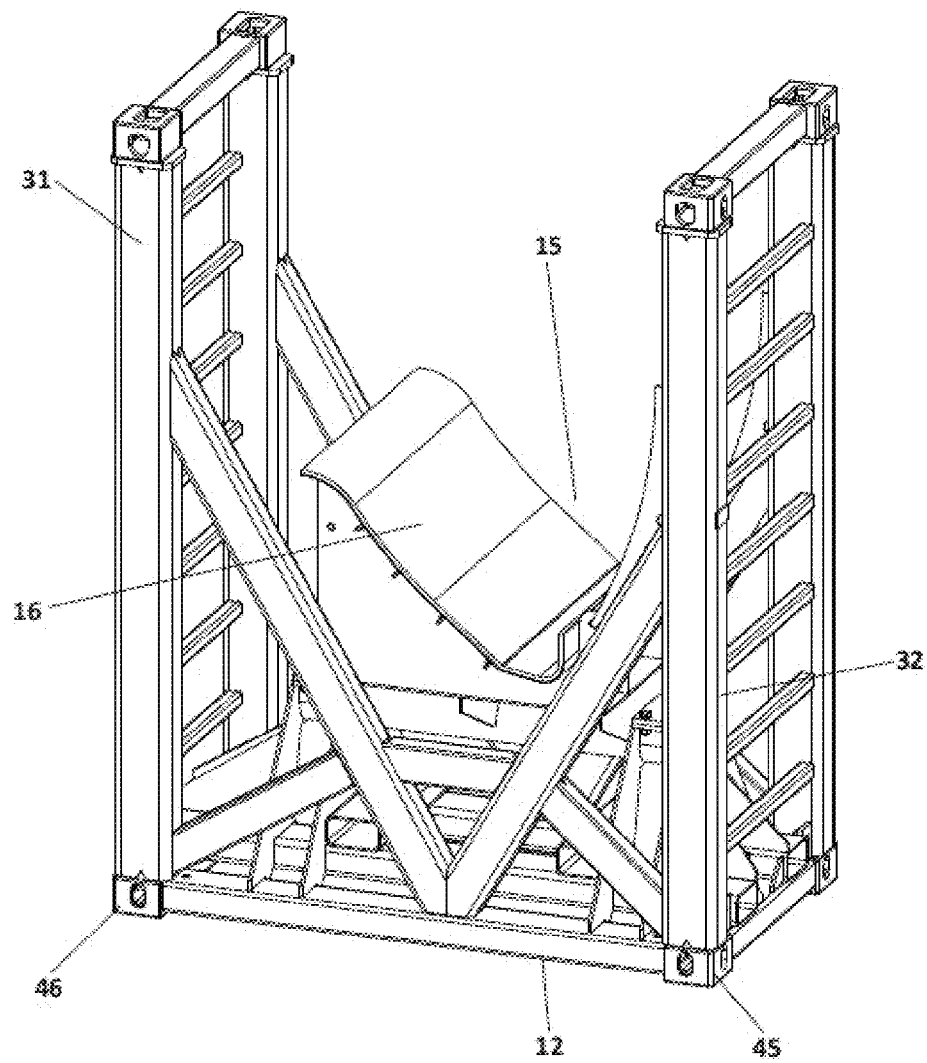
FIG. 5 shows a detail of the first tip frame of the first blade assembly of FIG. 3.
Figure 6:
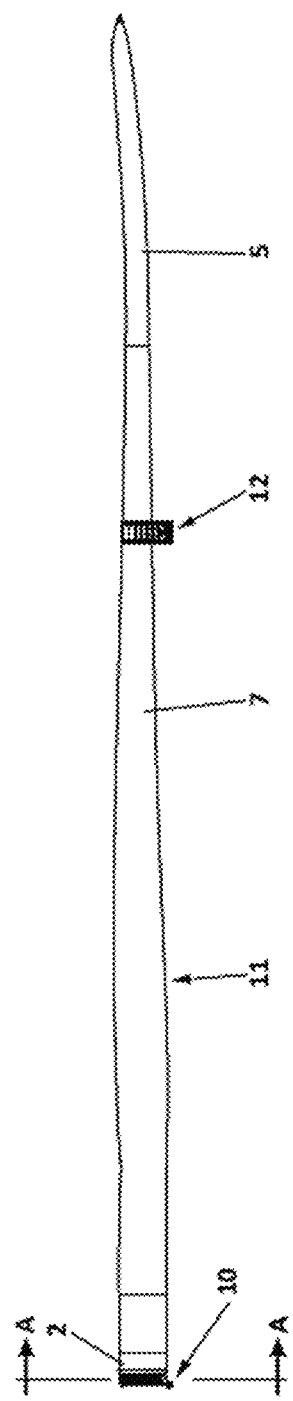
FIG. 6 shows a frontal view of FIG. 3.
Figure 7:
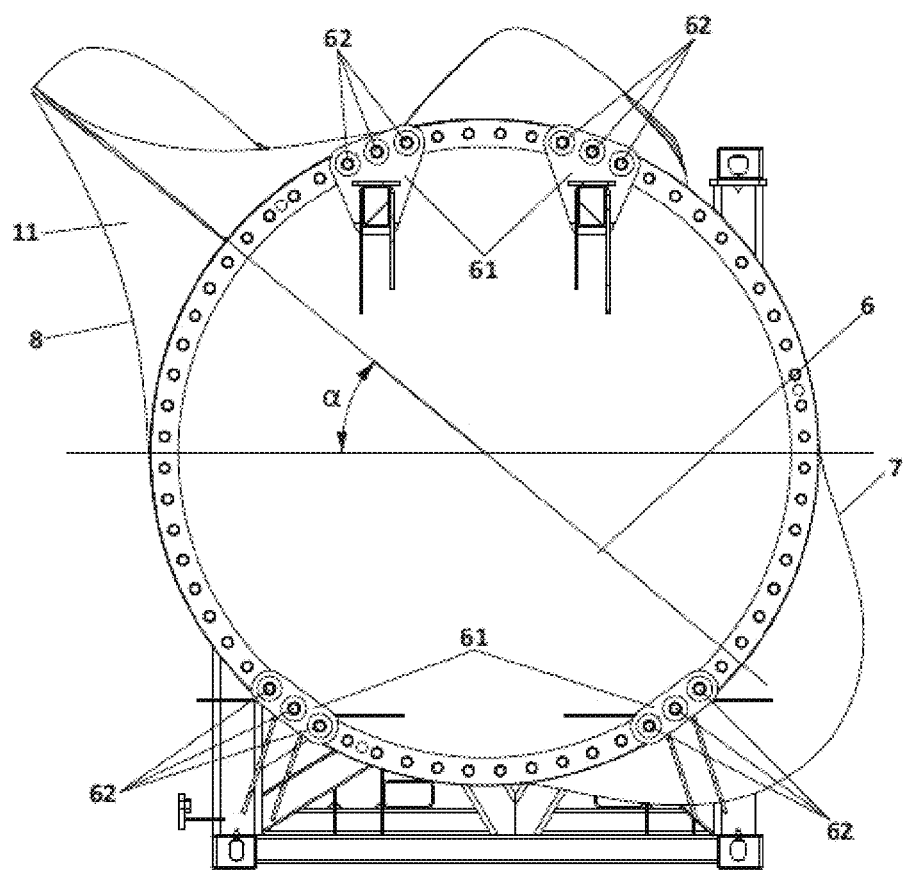
FIG. 7 shows a section AA of FIG. 6.
Figure 8:
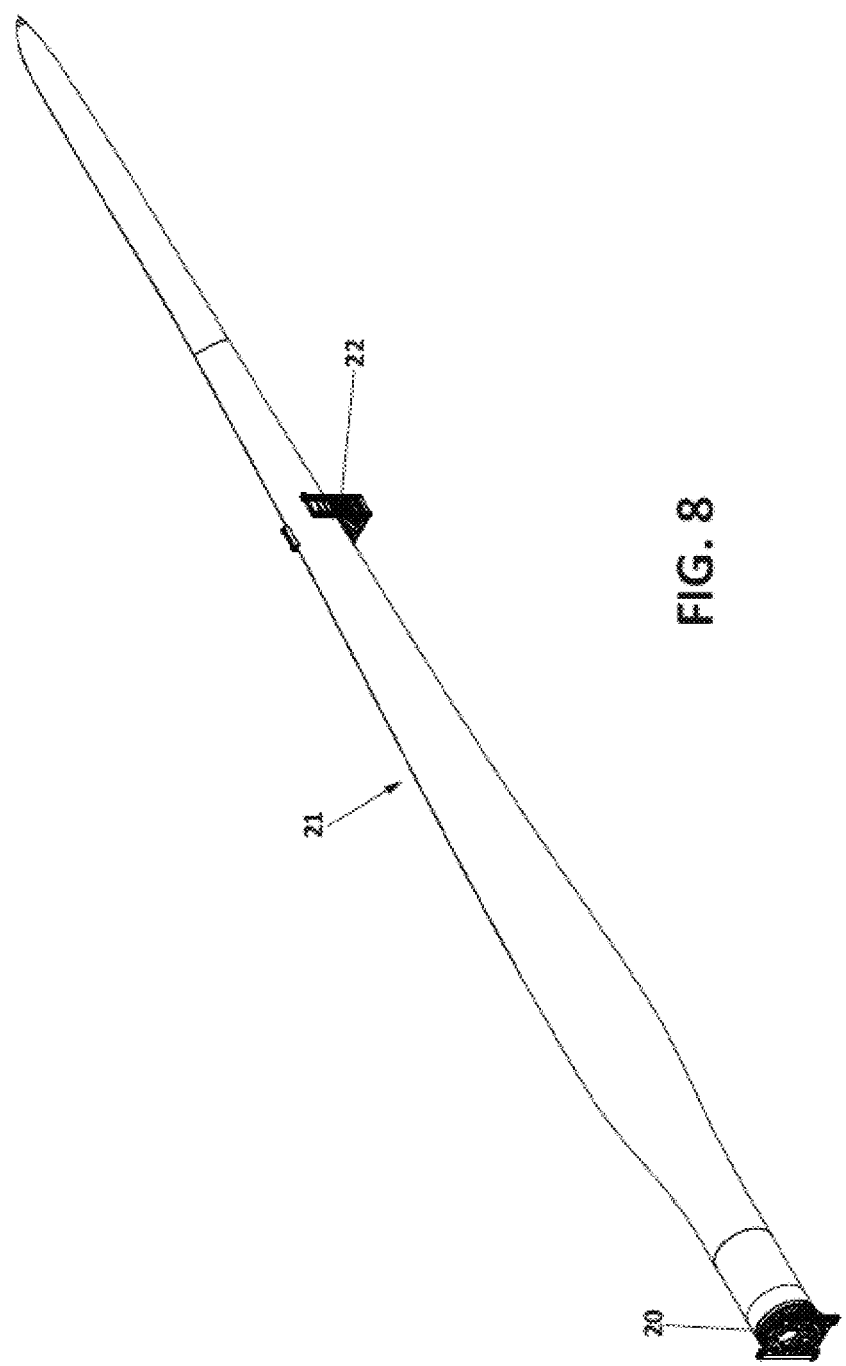
FIG. 8 shows a perspective view of a second blade assembly according to the transportation and storage system for wind turbine rotor blades of the present invention.
Figure 9:
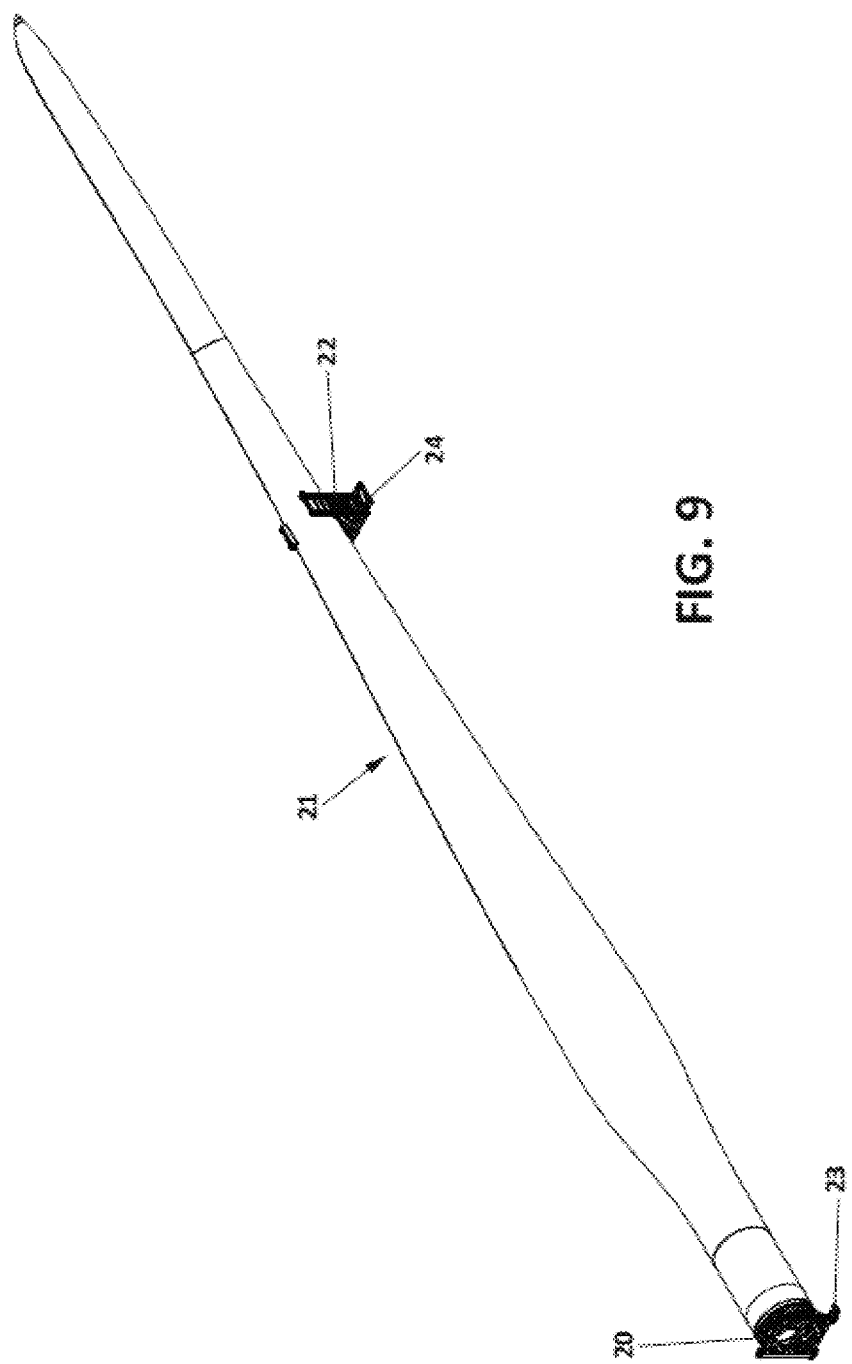
FIG. 9 shows a perspective view of a second blade assembly according to an alternative embodiment wherein the at least one rotor blade spacer comprising at least one root spacer configured to be arranged between the at least two root frames; and at least one tip spacer configured to be arranged between the at least two tip frames forms part of the second blade assembly of the transportation and storage system for wind turbine rotor blades of the present invention.
Figure 10:
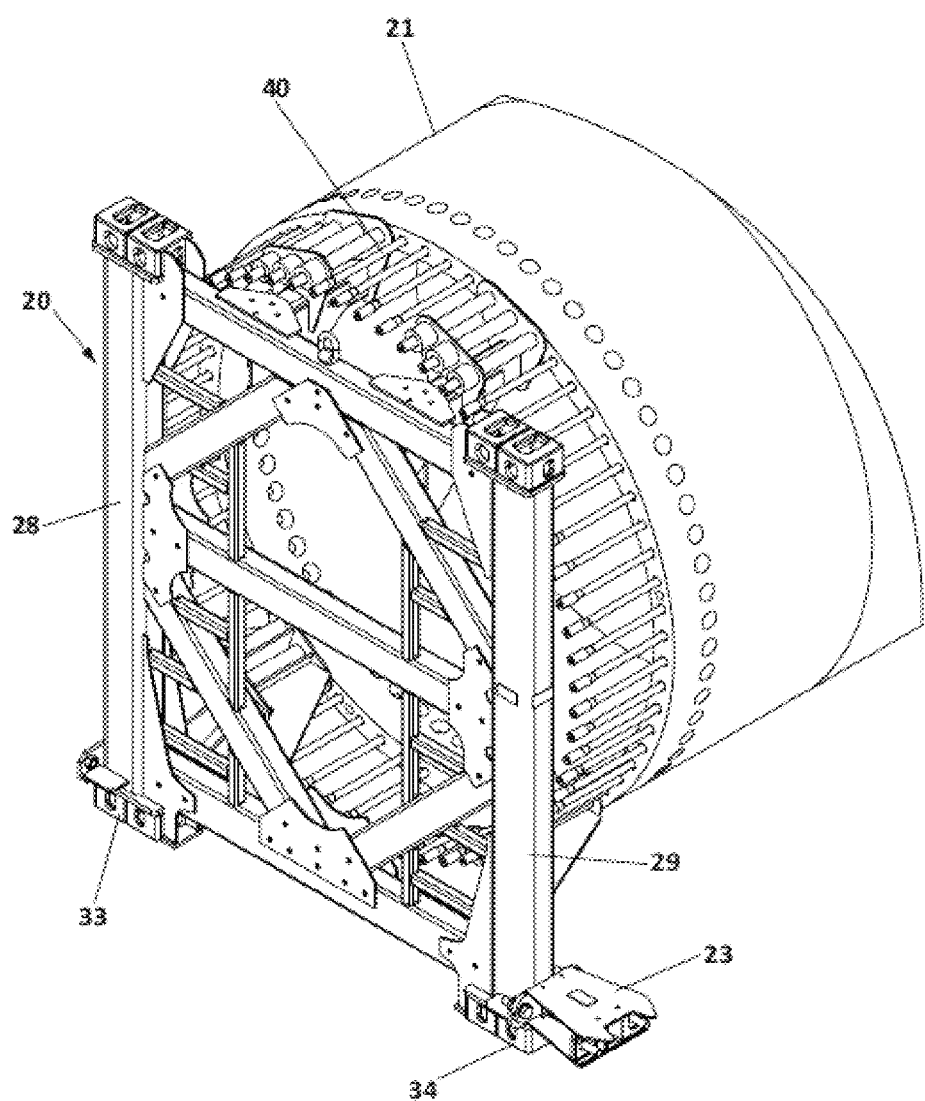
FIG. 10 shows a detail of the second root frame of the second blade assembly of FIG. 9.
Figure 11:
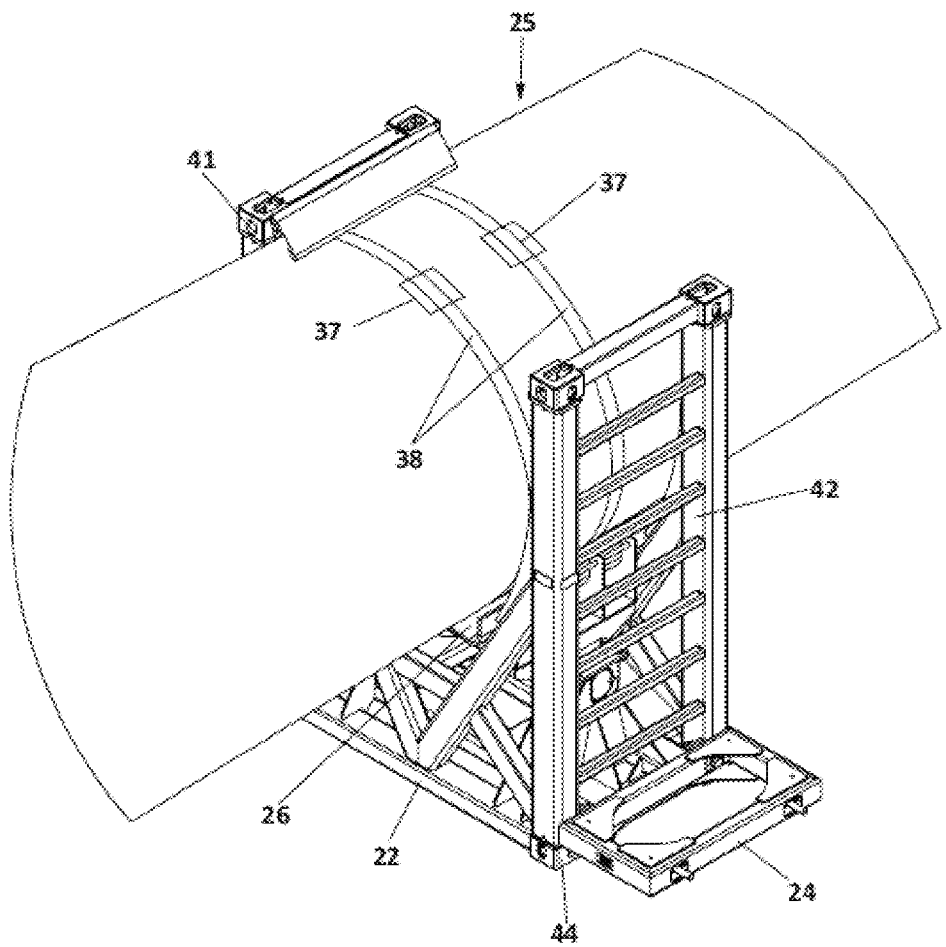
FIG. 11 shows a detail of the second tip frame of the second blade assembly of FIG. 9.
Figure 12:
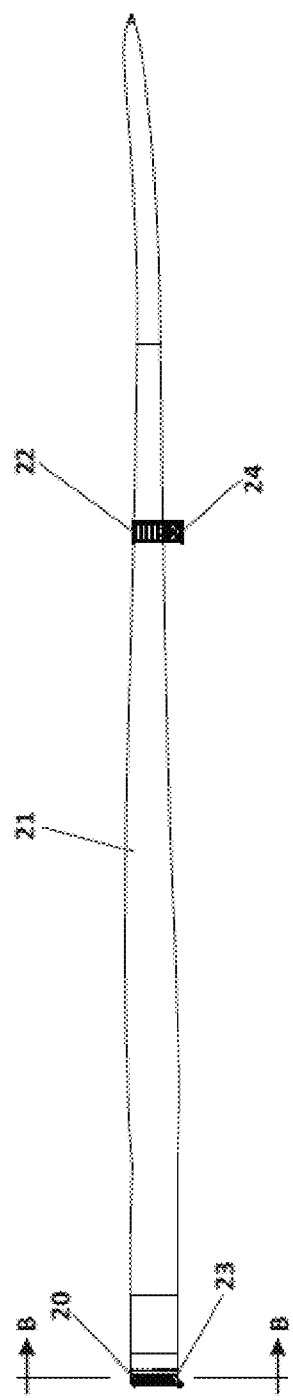
FIG. 12 shows a plan view of FIG. 9.
Figure 13:
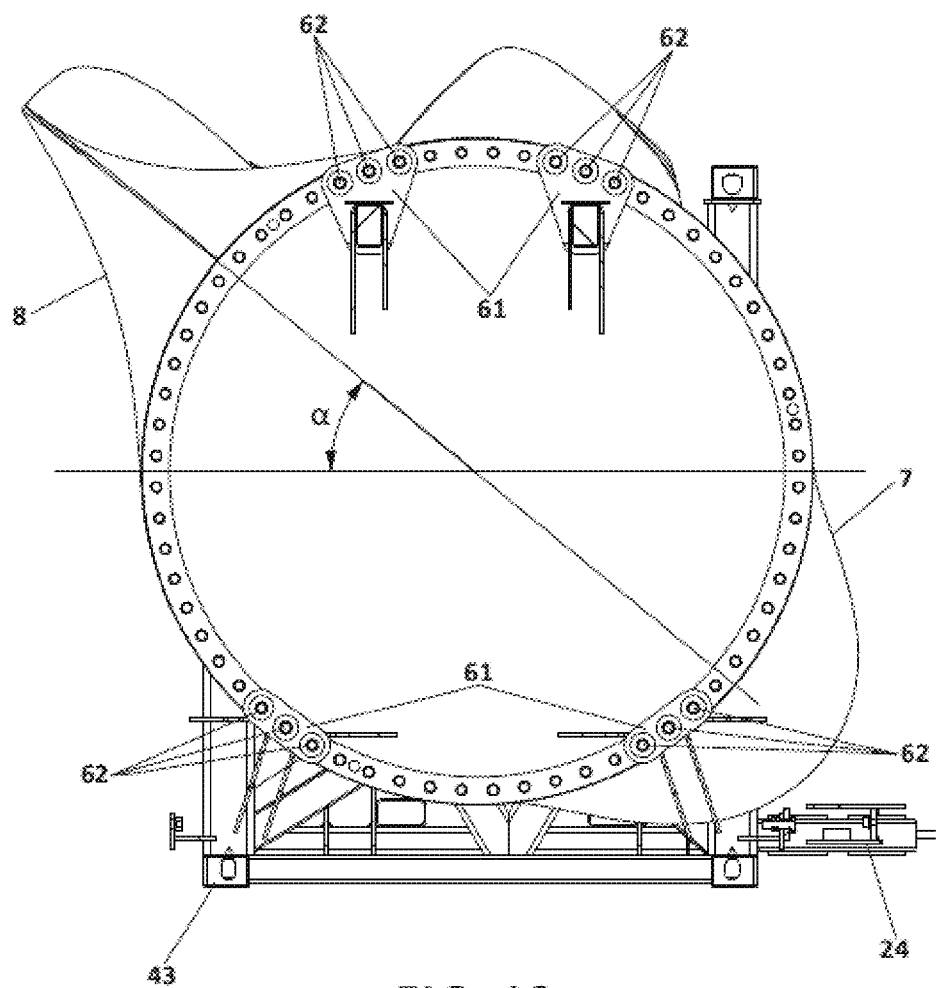
FIG. 13 shows a section BB of FIG. 12.

Preferably, the at least two tip frames (12, 22) comprise a wedge (17, 27), wherein the wedge (17, 27) is disposed on top of the cradle (16, 26), as shown in FIG. 5. The wedges (17, 27) are configured to attach the blades (11, 21) to the tip frames (12, 22).

The at least one root spacer (23) and the at least one tip spacer (24) are configured to be joined to the first root frame (10) and the second root frame (20), and to the first tip frame (12) and the second tip frame (22), respectively, preferably by means of joining means being bolts (51, 56) and nuts (52).

Optionally, the second blade assembly (20, 21, 22) is displaceable with respect to the first blade assembly (10, 11, 12). Optionally, the second blade assembly (20, 21, 22) is displaceable with respect to the first blade assembly (10, 11, 12) in a direction having a vertical and/or horizontal component, preferably in a horizontal direction essentially perpendicular to the longitudinal axis (1) of the wind turbine rotor blades (11, 21).

Preferably, the at least two root frames (10, 20) further comprises a first column (18, 28) and a second column (19, 29), and the at least two tip frames (12, 22) comprises a first column (31, 41) and a second column (32, 42).

The at least one root spacer (23) is configured to be joined to the first root frame (10) and to the second root frame (20), either to the first columns (18, 28) or to the second columns (19, 29) and the at least one tip spacer (24) is configured to be joined to the first tip frame (12) and to the second tip frame (22), either to the first columns (31, 41) or to the second columns (32, 42), since the column or side on which the second blade assembly (20, 21, 22) must be assembled to the first blade assembly (10, 11, 12) depends on the order of the loading and the stowage.

Preferably, the at least one root spacer (23) and the at least one tip spacer (24) are configured to be joined to the second root frame (20) and the second tip frame (22) respectively, either to a lower end (33, 43) of the first columns (28, 41) or to a lower end (34, 44) of the second columns (29, 42), whereas the second blade assembly (20, 21, 22) is configured to be joined to the first root frame (10) of the first blade assembly (10, 11, 12) by means of the at least one root spacer (23) and to the first tip frame (12) of the first blade assembly (10, 11, 12) by means of the at least one tip spacer (24), either to a lower end (35, 45) of the second columns (19, 32) or to a lower end (36, 46) of the first columns (18, 31) respectively.

Figure 16:
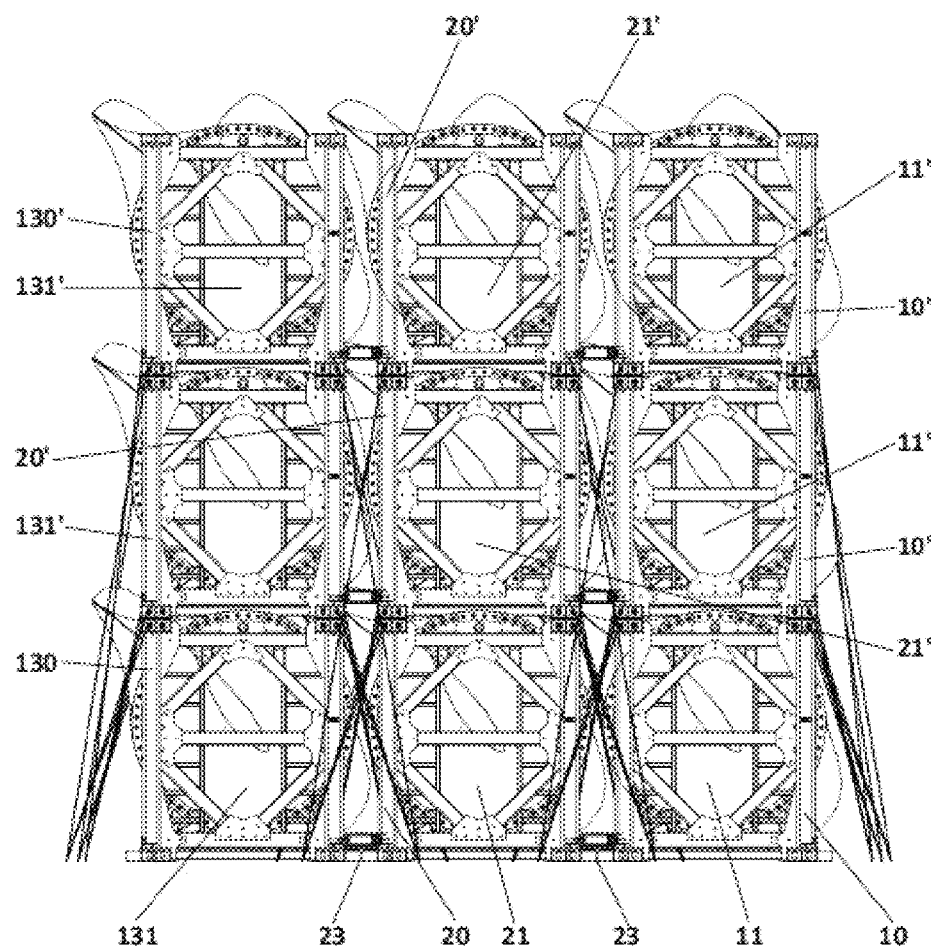
FIG. 16 shows a lateral view of FIG. 14.
Figure 17:
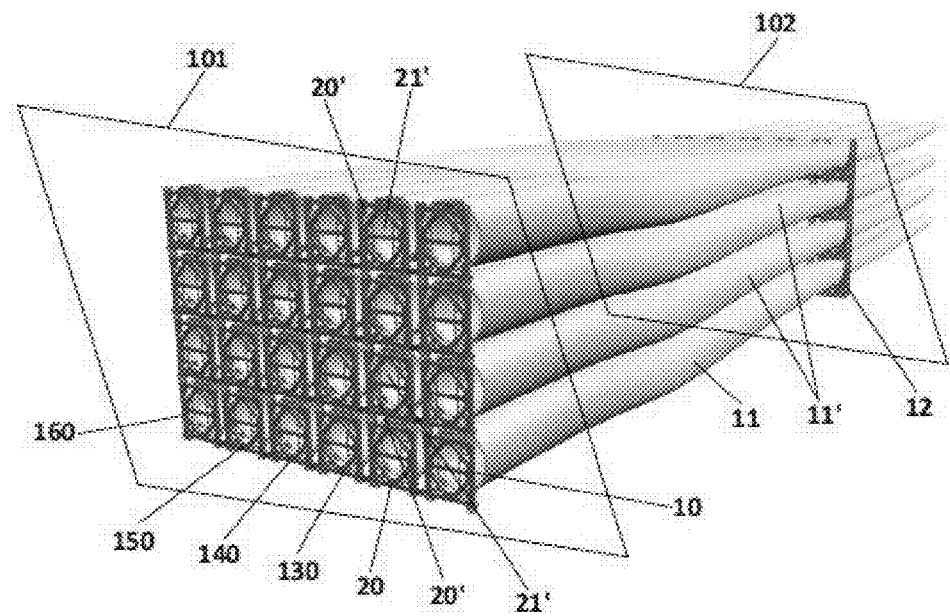
FIG. 17 shows another embodiment of the invention wherein the system comprises a stacked array of 4 row×6 columns blade assemblies.
Figure 18:
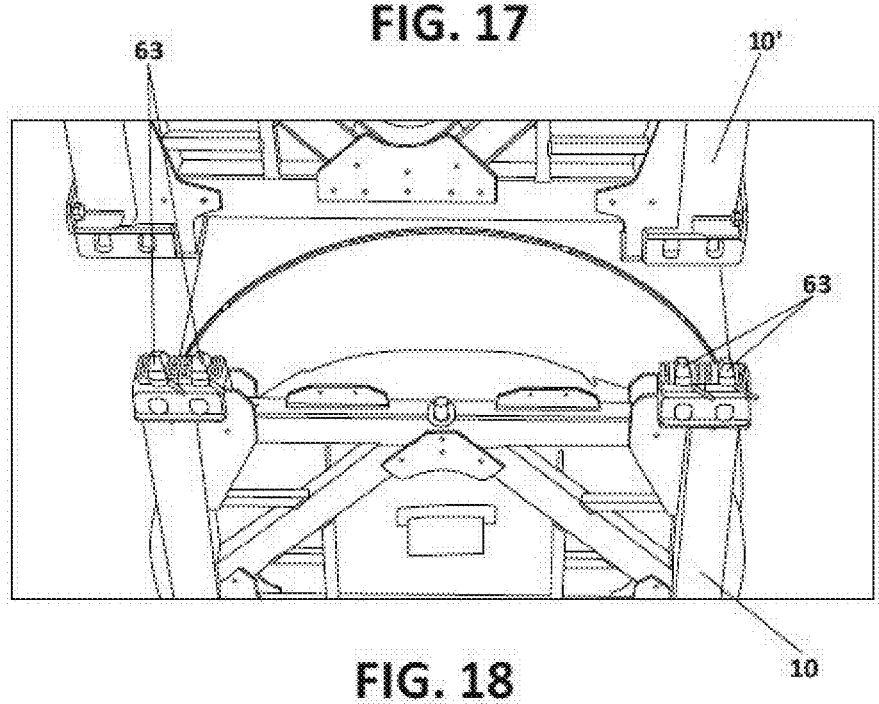
FIG. 18 shows the lifting of an additional first blade assembly of the second level or row for placing them on top of the first blade assembly of the first level or row.
Figure 19:
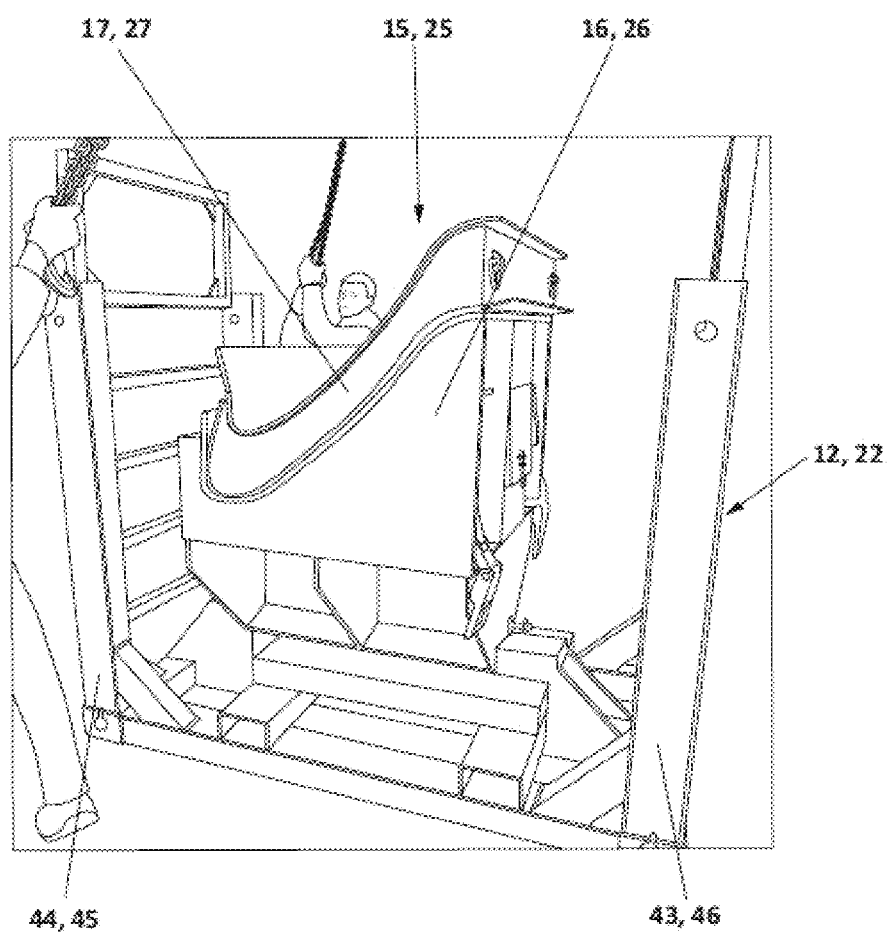
FIG. 19 shows a detail of a wedge disposed on top of a cradle of a tip frame.

In this preferred embodiment of the invention, the system further comprises at least one third blade assembly (130, 131, 132) configured to be joined to the second blade assembly (20, 21, 22) in the same way as those described above for the second blade assembly (20, 21, 22) and the first blade assembly (10, 11, 12), at least one additional first blade assembly (10', 11', 12') configured to be joined on top of the first blade assembly (10, 11, 12), and additional second blade assembly (20', 21', 22') configured to be joined to the additional first blade assembly (10', 11', 12') in the same way as those described above for the second blade assembly (20, 21, 22) and the first blade assembly (10, 11, 12), and additionally configured to be joined on top of the second blade assembly (20, 21, 22), and an additional third blade assembly (130', 131', 132') configured to be joined on top of the third blade assembly (130, 131, 132), thus configuring a transportation and storage stacked array system for wind turbine rotor blades of 3 row×3 columns as shown in FIGS. 14-16. In another non-limitative system shown in FIG. 17, a stacked array of 4 row×6 columns is formed, comprising 6 first blade assemblies (10, 11, 12, 10', 11', 12'), 6 second blade assemblies (20, 21, 22, 20', 21', 22'), 6 third blade assemblies (130, 131, 132, 130', 131', 132'), and additionally 6 fourth blade assemblies (140, 141, 142, 140', 141', 142'), 6 fifth blade assemblies (150, 151, 152, 150', 151', 152') and 6 sixth blade assemblies (160, 161, 162, 160', 161', 162').

It can be observed that the first root frames (10, 10') and the second root frames (20, 20') are contained in a first plane (101), and the first tip frame (12, 22) and a second tip frames (12', 22') are contained in a second plane (102).

The invention also relates to a method for the transportation and storage of wind turbine rotor blades carried out with the transportation and storage system described above, wherein the method comprises the following steps:
- a step of a guiding the second blade assembly (20, 21, 22) with respect to the first blade assembly (10, 11, 12) by means of the at least one root spacer (23) and/or the at least one tip spacer (24); and
- a step of joining the at least one root spacer (23) to the first root frame (10) and to the second root frame (20),
- a step of joining the at least one tip spacer (24) to the first tip frame (12) and to the second tip frame (22), such that a first blade assembly (10, 11, 12) comprising at least the first root frame (10), the first tip frame (12) and the first wind turbine blade (11) is joined to a second blade assembly (20, 21, 22) comprising at least the second root frame (20), the second tip frame (22) and the second wind turbine blade (21).

Optionally, the method further comprises:
- a step of connecting at least the first root frame (10), the first tip frame (12) and the first wind turbine blade (11);
  This step is carried out facing the first root frame (10) to the root end (2) of the first wind turbine blade (11) and inserting the studs (40) of the first wind turbine blade (11) into the orifices (62) of the fixation plates (61); and a step of connecting the second root frame (20), the second tip frame (22), and the second wind turbine blade (21);
  This step is carried out facing the second root frame (20) to the root end (2) of the second wind turbine blade (21) and inserting the studs (40) of the second wind turbine blade (21) into the orifices (62) of the fixation plates (61).

Preferably, the step of connecting at least the first root frame (10), the first tip frame (12) and the first wind turbine blade (11) is carried out by means of the first wind turbine blade (11).

Preferably, the step of connecting the second root frame (20), the second tip frame (22), and the second wind turbine blade (21) is carried out by means of the second wind turbine blade (21).

In another embodiment, the method applied to the system is as follows:

1. It will start by one of the sides of the vessel, truck or factory, positioning a first blade assembly (10, 11, 12).

2. A second blade assembly (20, 21, 22, 23, 24) with the spacers (23, 24) assembled is stowed next, making the longitudinal position of the frames (20, 22) match those (10, 12) of the previous blade assembly (10, 11, 12), so that the spacers (23, 24) of the second blade assembly (20, 21, 22, 23, 24) can be fixed with the corresponding frame (10, 12) of the first blade assembly (10, 11, 12).

3. Place the root spacer (23) of the second blade assembly (20, 21, 22, 23, 24) in front of the root frame (10) of the first blade assembly (10, 11, 12) in such a manner that the guiding means (27) of the root spacer (23) guide the second blade assembly (20, 21, 22) comprising the second blade (21) with respect to the first blade assembly (10, 11, 12) comprising the first blade (11);

4. Place the tip spacer (24) of the second blade assembly (20, 21, 22, 23, 24) in front of the tip frame (12) of the first blade assembly (10, 11, 12) in such a manner that the guiding means (56) of the tip spacer (27) guide the second blade assembly (20, 21, 22) comprising the second blade (21) with respect to the first blade assembly (10, 11, 12) comprising the first blade (11);

5. Screw the first blade assembly (10, 11, 12) to the spacers (23, 24) of the second blade assembly (20, 21, 22, 23, 24) using bolts, washers and square washers.

6. Check that the frames (10, 12, 20, 22) are at 90° and the distances between them are the same in the bottom and top to correctly perform the stowage in block.

7. Repeat the process with rest of the additional second blades assemblies (20', 21', 22', 23', 24') that will be transported in the first level.

8. When the first row is finished, fixation means, e.g. stoppers, are welded to the floor.

9. Lift the first blade assembly (10', 11', 12') of the second level and place on the first blade assembly (10, 11, 12). To join the two blade assembly can be used twist-locks (63), preferably 4 twist-locks disposed on the root frames (10, 10'), shown in FIG. 18 and 4 twist-locks (disposed on the tip frames (12, 12') (not shown).

10. The remaining blade assemblies of the second level must be lifted with the spacers (23, 24) assembled and placed on the blade assemblies of the first level, vertically joining by example, with the twist-locks and horizontally by the spacers (23, 24) as indicated in the previous steps.

11 The third and fourth levels will be loaded in the same way as the second.

12. Once the stowage of all blade assemblies is finished, the lashing of the blade assemblies is done, wherein steps 1 to 4 are completed in FIG. 9.

The invention claimed is:

1. A wind turbine rotor blade spacer for the transportation and storage of wind turbine rotor blades having a longitudinal axis and comprising a root end and a tip, and two halves bonded together forming an outer shell, the wind turbine rotor blade spacer comprising:
  a guide adapted to guide a second blade assembly comprising a second blade which in turn comprises a second root end supported on a second root frame, with respect to a first blade assembly comprising a first blade which in turn comprises a first root end supported on a first root frame, the first blade assembly joined to the second blade assembly with a separation between the first blade assembly and the second blade assembly,
  wherein the first root frame and/or the second root frame comprise a first width, the first width being measured in a direction perpendicular to a longitudinal axis of the first blade of the first blade assembly at a widest portion of the first root frame and/or the second root frame, respectively,
  wherein the first root end of the first blade and/or the second root end of the second blade comprise a first diameter, wherein the first width is smaller than the first diameter.

2. The spacer of claim 1 wherein the guide is configured to guide, the second blade assembly with respect to a first root frame or a first tip frame of the first blade assembly.

3. The spacer of claim 2 wherein the guide is configured to guide, the second blade assembly with respect to a first root frame or a first tip frame of the first blade assembly, in a direction having a vertical and/or horizontal component.

4. The spacer of claim 1 wherein the guide comprises a U-shaped end.

5. The spacer of claim 1 wherein the guide is also configured to avoid, the displacement of the second blade assembly with respect to the first blade assembly in a direction essentially parallel to the longitudinal axis of the wind turbine rotor blades.

6. The spacer of claim 2 further comprising a height which is less than 25% of a height of the first root frame or of a height of the first tip frame.

7. The spacer of claim 2 further comprising a depth which is greater than a depth of the first root frame or than a depth of the first tip frame, the depth of the spacer, the first root frame and the second root frame being measured in a longitudinal direction defined by a longitudinal axis of the first blade of the first blade assembly.

8. The spacer of claim 1 further comprising holes being adapted to join the second blade assembly to the first blade assembly.

9. The spacer of claim 8 further comprising at least a recess which facilitates the access to the holes wherein joining means is configured to join the second blade assembly to the first blade assembly.

10. A transportation and storage system for wind turbine rotor blades having a longitudinal axis and comprising a root end and a tip, and two halves bonded together forming an outer shell, wherein the system comprises:
  a first blade and a second blade;
  at least two root frames including a first root frame and a second root frame, each one of the first root frame and the second root frame configured to support the root end of the first blade and the root end of the second blade respectively;
  at least two tip frames including a first tip frame and a second tip frame, each one of the first tip frame and the second tip frame configured to support the tip of the first blade and the tip of the second blade respectively;
  at least one rotor blade spacer comprising a guide being adapted to guide a second blade assembly comprising the second blade with respect to the first blade assembly comprising the first blade, wherein the at least one rotor blade spacer is configured to be joined to the first root frame and to the second root frame or to be joined to the first tip frame and to the second tip frame such that the first blade assembly comprising at least the first root frame, the first tip frame and the first wind turbine blade is joined to the second blade assembly comprising at least the second root frame, the second tip frame and the second wind turbine blade, and wherein the spacer is configured to join the second blade assembly to the first blade assembly establishing a separation between the first blade assembly and the second blade assembly; and
  wherein the first root frame and/or the second root frame comprise a first width, the first width measured in a direction perpendicular to the longitudinal axis of the first blade at a widest portion of the first root frame and/or the second root frame, respectively, and wherein the root end of the first blade and/or the second blade comprises a first diameter, wherein the first width is smaller than the first diameter.

11. The system of claim 10 wherein the at least one rotor blade spacer comprises:
  at least one root spacer configured to be arranged between the at least two root frames; and
  at least one tip spacer configured to be arranged between the at least two tip frames;
  wherein the at least one root spacer and/or the at least one tip spacer are/is configured to guide the second blade assembly with respect to the first blade assembly; and
  wherein the at least one root spacer is configured to be joined to the first root frame and to the second root frame, and the at least one tip spacer is configured to be joined to the first tip frame and to the second tip frame.

12. The system of claim 10 wherein the at least one rotor blade spacer is joined to the first root frame and to the second root frame or to the first tip frame and to the second tip frame at a lower end of the first root frame and the second root frame or at a lower end of the first tip frame and the second tip frame.

13. The system of claim 10 wherein the at least one rotor blade spacer is joined to the first root frame and to the second root frame or to the first tip frame and to the second tip frame at an upper end of the first root frame and the second root frame or at an upper end of the first tip frame and the second tip frame.

14. The system of claim 10 wherein the second blade assembly is displaceable with respect to the first blade assembly in a direction having a vertical and/or horizontal component.

15. The system of claim 10 wherein the at least two tip frames comprise an upwardly open cradle-receiving space configured to receive a cradle, wherein the cradle is adapted to support the first blade or the second blade in a position in which a line joining two halves of an outer shell of the first blade or the second blade forms an angle of 20-50° with horizontal.

16. The system of claim 10 further comprising at least one third blade assembly configured to be joined to the second blade assembly by an additional rotor blade spacer.

17. The system of claim 10 further comprising at least one additional first blade assembly configured to be joined on top of the first blade assembly, including at least one additional second blade assembly configured to be joined on top of the second blade assembly and additionally configured to be joined to the additional first blade assembly by an additional rotor blade spacer.

18. The spacer of claim 1 wherein the spacer is also configured to join the second blade assembly to the first blade assembly, wherein the first blade assembly and the second blade assembly are arranged horizontally adjacent to each other.

* * * * *